(No Model.)
S. LEE.
PNEUMATIC TIRE.
No. 532,466.
Patented Jan. 15, 1895.
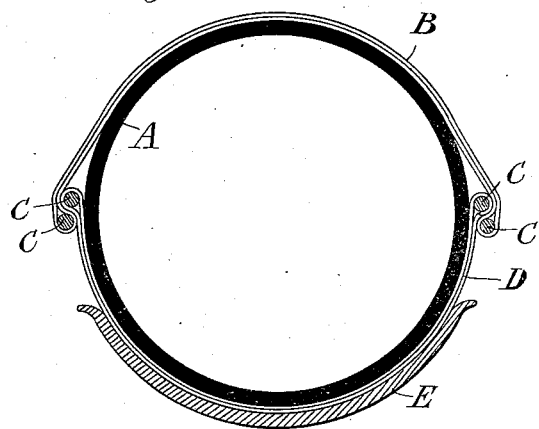
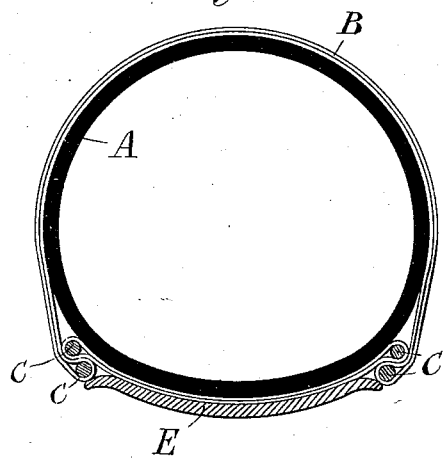
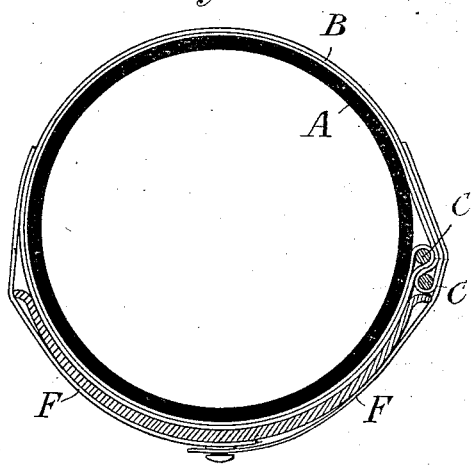
Witnesses
A. N. Dobson
E. L. Thrasher.
Inventor
Sydney Lee
by Foster Freeman
Atty

UNITED STATES PATENT OFFICE.

SYDNEY LEE, OF LONDON, ENGLAND.

PNEUMATIC TIRE.

SPECIFICATION forming part of Letters Patent No. 532,466, dated January 15, 1895.

Application filed January 4, 1893. Serial No. 457,229. (No model.) Patented in England December 13, 1892, No. 22,966, and in Germany December 22, 1892, No. 71,392.

*To all whom it may concern:*

Be it known that I, SYDNEY LEE, a subject of the Queen of England, residing at London, England, have invented certain new and useful Improvements in or Relating to Pneumatic Tires, (for which I have obtained Letters Patent of Great Britain, No. 22,966, dated December 13, 1892, and of Germany, No. 71,392, dated December 22, 1892,) of which the following is a specification.

This invention relates to pneumatic tires for wheels particularly cycle wheels and will be best understood by reference to the accompanying drawings, each of which is a section through the complete tire and rim showing the construction and method of fastening, like letters representing like parts in the three figures.

Referring first to Figure 1, A represents an air tube of any ordinary construction preferably of pure rubber without any canvas or the like although canvas can be used in it if desired. Outside the air tube A is a cover B formed of canvas, silk or other suitable material with or without rubber or of other suitable material. This cover B is a flat strip of the material, say canvas, having at each edge a wire, cord, selvage, or other suitable thickening device C. C I prefer to make of wire and it may be secured to the cover B in any suitable manner as by turning over the edge of the canvas to form a pipe in which the wire is carried or the cover B may be woven as a complete tube flattened out so as to present two thicknesses and carrying the wires at the edges as clearly illustrated in Fig. 1. The wires, cords or other devices C are formed into circles or hoops and the ends of the strip of canvas B are brought together and joined up so that that also forms a circle adapted to the size of the wheel, the cover B thus consisting of the canvas forming a circle and the two hoops C also forming circles, the cross sectional view when the tire is inflated being as represented in Fig. 1.

D represents another cover substantially the same as B though usually B would have a covering of rubber of some thickness upon the tread of the wheel, whereas D would not always require such a covering. Usually I find it desirable to insure that the exposed portions of D shall be properly waterproof and may cover or impregnate parts or the whole of D with thin rubber or other suitable material for that purpose.

E represents the rim of the wheel and may be of any ordinary construction and carry the spokes in any suitable manner.

In fitting to a wheel, a tire constructed in the manner shown in Fig. 1, the inner cover D is placed into the rim E, the air tube A is then placed in or upon the cover D and the cover B is then placed over the air tube and upon the cover D, the wire hoops of the cover B being preferably of smaller diameter than the wire hoops of the inner cover D so that these wire hoops of D will prevent the wire hoops of B from being drawn past them when the tire is inflated. In practice, I find there is little risk, of this, as the non-stretchability of the hoop prevents any slipping, so that the hoops need not necessarily be drawn past one another.

The drawings, Fig. 1, represents the tire when inflated and it will be seen that the inflation of the tire A makes a secure lock between the two hoops C upon each side thereof, while the canvas or similar material B D being inelastic there is no danger of the whole tire coming out of the rim, so that these covers while forming a protection to the air tube also form an absolute fastening of the whole tire onto the rim without any means of directly securing the tire to the rim, although if desired means such as solution or the like may be employed to connect the inner cover D with the rim. In practice I do not find any such connection between the inner cover D and the rim E to be necessary, but it is sometimes a convenience to have the cover D fixed to the rim as then D will always be in its proper position. The same would apply in the case of the inner part of the single cover, illustrated in Fig. 3.

To remove the air tube for repairs or other reason all that is necessary is to deflate it when the cover B is instantly entirely free except where held to the rim by the air valve and both cover and air-tube may be removed as also can the cover D should that not be secured to the rim. Upon inflating the tire A, the covers having been placed as previously described, immediately lock themselves and the whole tire securely in position. As in case of puncture, the cover B, and, if not secured to the rim, the inner cover D also, would be entirely free and the whole tire might thus escape from the rim and cause an accident, I may employ any suitable means to prevent this, a convenient device consisting of the flaps or bands F shown in Fig. 3, (but applicable to the other forms) which pass around the rim and are connected together by a button and buttonhole, hook and eye or other suitable devices. These flaps or bands are not intended to hold the tire on under ordinary circumstances, but merely to prevent it from coming off in case of accident. They may be dispensed with, but I prefer to have them.

In Fig. 2 the device illustrated is substantially the same as in Fig. 1 but a shallower rim is shown and the top cover B is carried farther round while the inner cover D is made narrower so that the wire hoops join near the edges of the rim E; otherwise the tire is the same as that described with reference to Fig. 1.

In Fig. 3 the same idea is embodied but instead of employing two separate covers, I employ a single cover B of greater breadth than either of the covers B previously described and adapted to entirely envelop the air tube A. This cover has two wire or other hoops C only one preferably of larger diameter than the other, the hoops and covers overlapping in the manner previously described.

In the drawings I have shown the wire hoops or hoop C appertaining to the outer cover B, or to the outer portion of the cover as being of smaller diameter than the wire hoop or hoops C of the inner cover D or portion of the cover, and the corresponding cover or portion of the cover overlapping, but it will be understood that this arrangement may be reversed.

I also wish to make it clear that although I prefer to make the hoops C of different diameters as there is no difficulty in forcing the larger hoop through the smaller one as the wires readily accommodate themselves to such a proceeding, yet in practice the hoops may be made very nearly if not absolutely of the same size. Each pair of hoops instead of practically touching as indicated in the drawings, may be a somewhat considerable distance apart. I have successfully used them as much as half an inch apart the pressure in the tire preventing them from slipping. The wires may be placed at any part of the tire, say for instance at the very center of the tread and more than two covers may be used and also more wires, though I consider two covers and four wires sufficient.

It will therefore be seen that by the arrangements above set forth I have produced a tire cover and a tire fastening in one which entirely dispenses with the necessity for any special fastening between the cover or tire and the rim of the wheel.

I claim—

1. In an inflatable tire the method of securing one cover to another by means of four hoops one at each edge of each cover the said hoops or covers overlapping and being prevented from disengagement by the inflation of the tire as set forth.

2. In an inflatable tire the method of securing one cover to another by means of four hoops one at each edge of each cover which are prevented from disengagement by the inflation of the tire as set forth.

3. The method of securing one edge of a cover to the other edge by means of two hoops or rings one secured to each of the said edges the edges of the cover overlapping and being retained in position solely by the pressure in the tire.

4. In an inflatable tire the combination with an air tube of a cover B having a hoop or ring C at each edge and a second cover D also having a hoop C at each edge as set forth.

5. In an inflatable tire the combination with an air tube of a cover B made of silk having a hoop or ring C at each edge and a second cover D also made of silk having a hoop C at each edge as set forth.

6. In an inflatable tire the combination with the rim of the wheel of an air tube A two covers B D and four hoops or rings C as set forth.

7. The combination with the rim; of a non-expansible cover having a hoop or ring at each edge, the rings being of different diameter, and an air tube by the inflation of which the cover is secured to the rim; substantially as described.

8. The combination with the rim; of two non-expansible covers having a hoop or ring at each edge of each cover, the rings of one cover being of different diameter from those of the other, an air tube by the inflation of which the covers and tube are held in position on the rim; substantially as described.

9. The combination with the rim, of a cover having a ring or hoop at each edge and an air tube within the cover by the inflation of which the cover is held to the rim, and flaps F upon the cover for securing the cover to the rim in case of emergency, substantially as described.

In testimony whereof I have hereto set my hand in the presence of the two subscribing witnesses.

SYDNEY LEE.

Witnesses:
HARRY B. BRIDGE,
C. ROSE.